United States Patent
Yoshida

(10) Patent No.: US 9,541,373 B2
(45) Date of Patent: Jan. 10, 2017

(54) MAGNETIC DETECTOR EQUIPPED WITH ROTOR INCLUDING SIGNAL GENERATION UNIT

(71) Applicant: FANUC CORPORATION, Yamanashi (JP)

(72) Inventor: Hirosato Yoshida, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/611,692

(22) Filed: Feb. 2, 2015

(65) Prior Publication Data

US 2015/0219435 A1    Aug. 6, 2015

(30) Foreign Application Priority Data

Feb. 5, 2014  (JP) ................. 2014-020520

(51) Int. Cl.
*G01B 7/30* (2006.01)
*G01D 5/14* (2006.01)

(52) U.S. Cl.
CPC ............. *G01B 7/30* (2013.01); *G01D 5/147* (2013.01)

(58) Field of Classification Search
CPC ........................................... G01B 7/30
USPC .................................. 324/207.25
See application file for complete search history.

(56) References Cited

U.S. PATENT DOCUMENTS 6,064,198 A * 5/2000 Wolf et al. ............... 324/207.2
8,203,332 B2 * 6/2012 Guo et al. ............... 324/207.25
2007/0247144 A1 * 10/2007 Tokuhara et al. ........ 324/207.25
2012/0313623 A1 * 12/2012 Hammerschmidt et al. ........................... 324/207.2

FOREIGN PATENT DOCUMENTS

| JP | H03-197820 A | 8/1991 |
|---|---|---|
| JP | H09021652 A | 1/1997 |
| JP | 10206448 A | 8/1998 |
| JP | H11-277149 A | 10/1999 |
| JP | 2004257850 A | 9/2004 |
| JP | 2006010436 A | 1/2006 |
| JP | 2006177865 A | 7/2006 |
| JP | 2006192657 A * | 7/2006 |
| JP | 2007198885 A | 8/2007 |
| JP | 2009097924 A | 5/2009 |
| JP | 2010118121 A | 5/2010 |
| JP | 2013053990 A | 3/2013 |
| JP | 2013185826 A | 9/2013 |
| JP | 2013238485 A | 11/2013 |

OTHER PUBLICATIONS

JP 2006192657 A, Partial Translation, Jul. 2006.*

(Continued)

*Primary Examiner* — Bot Ledynh
(74) *Attorney, Agent, or Firm* — Fredrikson & Byron, P.A.

(57) ABSTRACT

A magnetic detector includes a rotor including a signal generation unit in a surface perpendicular to a rotary shaft and configured to rotate around the rotary shaft, and a detection unit configured to detect a rotational angle of the rotor by using magnetism via the signal generation unit. A plurality of concave and convex portions of the signal generation unit is formed by electroforming or sintering. In the surface, a projection portion is preferably disposed radially inside or outside the rotor with respect to the signal generation unit.

3 Claims, 4 Drawing Sheets

(56) References Cited

OTHER PUBLICATIONS

Untranslated Notification of Reasons for Refusal for JP Application No. 2014-020520, dated Aug. 11, 2015, 4 pages.
Untranslated Notification of Reasons for Refusal for JP Application No. 2014-020520, dated Apr. 7, 2015, 3 pages.
Translated Notification of Reasons for Refusal for JP Application No. 2014-020520, dated Aug. 11, 2015, 3 pages.
Translated Notification of Reasons for Refusal for JP Application No. 2014-020520, dated Apr. 7, 2015, 3 pages.
English abstract and machine translation for Japanese Publication No. JP 2004-257850, published Sep. 16, 2004, 10 pgs.
English abstract and machine translation for Japanese Publication No. JP 10-206448 published 198-08-07, 14 pgs.
English abstract and machine translation for Japanese Publication No. JP 2013-185826 published Sep. 19, 2013, 18 pgs.
English Translation of Japanese Publication No. 2010118121, published May 27, 2010, 16 pages.
English Translation of Japanese Publication No. 2007198885, published Aug. 9, 2007, 11 pages.
English Translation of Japanese Publication No. 2013238485, published Nov. 28, 2013, 40 pages.
English Translation of Abstract of Japanese Publication No. H09021652 published Jan. 21, 1997, 1 page.
English Machine Translation of Japanese Publication No. 2013053990 published Mar. 21, 2013, 19 pages.
English Machine Translation of Japanese Publication No. 2009097924 published May 7, 2009, 19 pages.
English Machine Translation of Japanese Publication No. 2006177865 published Jun. 7, 2006, 13 pages.
English Machine Translation of Japanese Publication No. 2006010436 published Jan. 12, 2006, 9 pages.
English Machine Translation of Abstract of Japanese Publication No. H03-197820 published Jul. 6, 2006, 1 page.
English Machine Translation of Japanese Publication No. H11-277149 published Oct. 12, 1999, 9 pages.

\* cited by examiner

MAGNETIC DETECTOR EQUIPPED WITH ROTOR INCLUDING SIGNAL GENERATION UNIT

FIELD OF THE INVENTION

1. Technical Field

The present invention relates to a magnetic detector equipped with a rotor that includes a signal generation unit in a surface perpendicular to a rotation axis, for example, a magnetic encoder.

2. Description of the Related Art

In order to detect a rotational position of a rotating member such as a motor output shaft or an automobile wheel, a magnetic detector that uses magnetism, for example, a magnetic encoder is commonly used. The magnetic detector includes a rotor configured to rotate around a rotary shaft and a detection unit configured to detect a rotational angle of the rotor. The detection unit detects the rotational angle of the rotor via a signal generation unit included in the rotor.

A rotor of a magnetic detector disclosed in Japanese Laid-open Patent Publication No. 2004-257850 (JP 2004-257850 A) includes a signal generation unit in its peripheral surface. In other words, in JP 2004-257850 A, the signal generation unit is disposed in the surface parallel to a rotary shaft of the rotor.

On the other hand, rotors of magnetic detectors disclosed in Japanese Laid-open Patent Publication Nos. 10-206448 and 2013-185826 (JP 10-206448 A and JP 2013-185826 A) include signal generation units in upper or lower surfaces thereof. In other words, in JP 10-206448 A and JP 2013-185826 A, the signal generation units are arranged in the surfaces perpendicular to rotary shafts of the rotors.

In such a magnetic detector that includes a signal generation unit in the surface perpendicular to the rotary shaft, a distance is not changed between the signal generation unit and a detection unit even when the rotor is eccentric with respect to the rotary shaft. Thus, such a signal generation unit has an advantage of being able to stably output a signal during rotation of the rotor.

However, in a magnetic detector that includes a signal generation unit in the surface perpendicular to the rotary shaft, it is difficult to use a tooth polishing machine or the like for forming a signal generation unit of the rotor. As a result, it is difficult to improve accuracy in forming the signal generation unit, and thus manufacturing costs of the rotor greatly increase.

In JP 10-206448 A, in order to inexpensively manufacture the rotor with high accuracy, a magnet ring including a signal generation unit is manufactured by using a plastic magnet. However, a heat resistant temperature of the plastic magnet is lower than a usual magnet, and thus it is difficult to use the magnetic detector including the rotor equipped with such a magnet ring in a high-temperature environment. Mechanical strength of the plastic magnet is also lower than a common magnet, and thus it is difficult to rotate the rotor at a high speed.

In JP 2013-185826 A, in order to inexpensively manufacture the rotor with high accuracy, the rotor is manufactured from a ferromagnetic plate through which a plurality of penetration slits has been formed. Such a ferromagnetic plate can be inexpensively manufactured with high accuracy by etching or pressing. However, the formation of the plurality of penetration slits in the ferromagnetic plate causes the strength of the rotor to deteriorate. As a result, it is difficult to rotate the rotor at a high speed.

Further, in both JP 10-206448 A and JP 2013-185826 A, the signal generation units are located in the upper or lower surfaces of the rotors. This is disadvantageous in that the signal generation unit of the rotor is easily damaged during manufacturing or transportation of the rotor or during assembling of the magnetic detector.

The present invention has been made with the above-described problems taken into consideration, and has an object to provide a magnetic detector configured such that a signal generation unit of a rotor is difficult to be damaged while having sufficient strength to enable high-speed rotation of the rotor.

SUMMARY OF THE INVENTION

According to a first aspect of the present invention, a magnetic detector includes a rotor including a signal generation unit in a surface perpendicular to a rotary shaft and configured to rotate around the rotary shaft, and a detection unit configured to detect a rotational angle of the rotor by using magnetism via the signal generation unit. A plurality of concave and convex portions of the signal generation unit is formed by electroforming or sintering.

According to a second aspect of the present invention, in the magnetic detector according to the first aspect, in the surface of the rotor perpendicular to the rotary shaft, a projection portion is disposed radially inside or outside the rotor with respect to the plurality of concave and convex portions of the signal generation unit.

According to a third aspect of the present invention, in the magnetic detector according to the first aspect, in the surface of the rotor perpendicular to the rotary shaft, a circumferential groove or a circumferential notch is formed to extend in a circumferential direction of the rotor, and the plurality of concave and convex portions of the signal generation unit is formed in the circumferential groove or the circumferential notch.

BRIEF DESCRIPTION OF THE DRAWINGS

The above objects, features, and advantages, and other objects, features, and advantages of the present invention will become more apparent from the following detailed description of the exemplary embodiments of the present invention taken in connection with the accompanying drawings, in which.

DETAILED DESCRIPTION

Figure 1:
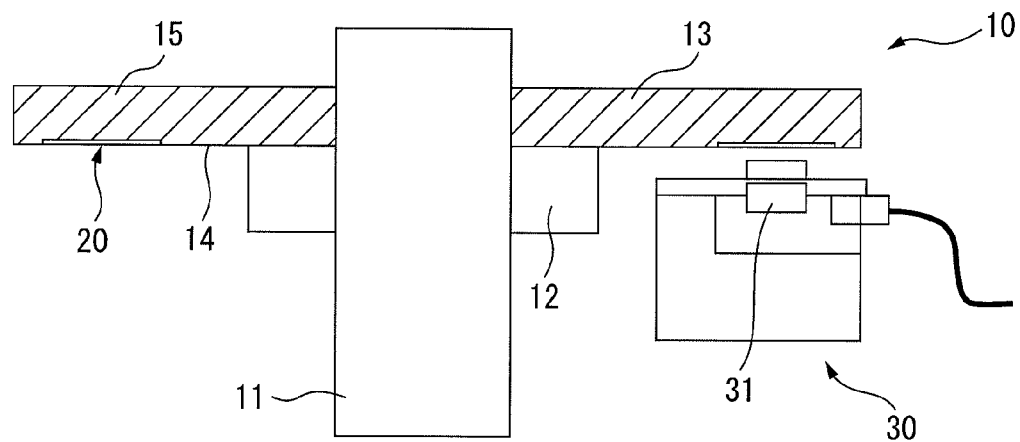
FIG. 1 is an axial-direction sectional view illustrating a magnetic detector according to a first embodiment of the present invention.

Hereinafter, the embodiments of the present invention will be described with reference to the accompanying drawings. Throughout the drawings, substantially the same members are denoted by the same or corresponding reference numerals. For easier understanding, scales of the drawings are changed as necessary.

FIG. 1 is an axial-direction sectional view illustrating a magnetic detector according to a first embodiment of the present invention, for example, a magnetic encoder. As illustrated in FIG. 1, the magnetic detector 10 mainly includes a disk rotor 13 integrally rotated with a rotary shaft 11, and a detection unit 30 configured to detect a rotational angle of the rotor 13. A bottom surface 14 of the rotor 13 is supported by a flange support unit 12 integrally coupled to the rotary shaft 11.

According to the present invention, a signal generation unit 20 is formed radially outside the support unit 12 in the bottom surface 14 of the rotor 13. In other words, the signal generation unit 20 according to the present invention is formed in the bottom surface 14 perpendicular to the rotary shaft 11. As known, the signal generation unit 20 includes a plurality of concave and convex portions formed at equal intervals in a circumferential direction of the rotor 13. Note that no signal generation unit 20 is formed in a top surface 15 of the rotor 13.

As illustrated in FIG. 1, the detection unit 30 is located to face the signal generation unit 20 formed in the bottom surface 14 of the rotor 13. The detection unit 30 includes a single-pole magnetized magnet 31, and is configured to detect the rotational angle of the rotor 13 by using the single-pole magnetized magnet 31. The single-pole magnetized magnet 31 is higher in heat resistance than a magnetic detector that includes a multipole magnetized magnet or a plastic magnet. Thus, the magnetic detector 10 according to the present invention can be used in a high-temperature environment.

According to the first embodiment of the present invention, the signal generation unit 20 of the rotor 13 is formed by electroforming. Therefore, the rotor 13 is preferably made of nickel or a nickel alloy.

Specifically, a highly accurate master model is formed in advance for the signal generation unit 20, and then molded by electroforming. Thus, according to the present invention, the rotor 13 including the signal generation unit 20 accurately reproducing shapes of concave and convex portions of the master model by nanometers and having accuracy equal to that of the master model can be inexpensively manufactured with high accuracy. According to the present invention, a signal generation unit 20 is formed, by electroforming, for a rotor 13 formed in advance by a method other than the electroforming. As a result, material costs and working hours can be also reduced.

As can be understood from FIG. 1, no penetration slit or the like is formed in the rotor 13 of the magnetic detector 10. Thus, even when the rotor 13 of the present invention is rotated at a high speed, sufficient strength can be secured without damaging the rotor 13.

According to another embodiment of the present invention, a signal generation unit 20 of a rotor 13 may be formed by sintering. As described above, the signal generation unit 20 according to the present invention is formed in the bottom surface 14 of the rotor 13 perpendicular to the rotary shaft 11. Therefore, according to the present invention, a pressure direction during the sintering is perpendicular to the bottom surface 14, and thus a pressure force is directly applied to the bottom surface 14. As a result, the signal generation unit 20 can be filled with sufficient powder even when the unit is very small, and the high-resolution and highly accurate rotor 13 can be manufactured by sintering.

The signal generation unit 20 has hitherto been formed in a surface parallel to the rotary shaft 11, for example, in the peripheral surface of the rotor 13. In this case, a pressure direction during sintering is parallel to the peripheral surface, and accordingly a pressure force is not directly applied to the peripheral surface. Thus, when the signal generation unit 20 is very small, a filling rate of powders is insufficient, disabling formation of the small signal generation unit 20. As a result, it is difficult to manufacture a high-resolution and highly accurate rotor 13 by sintering.

Figure 2:
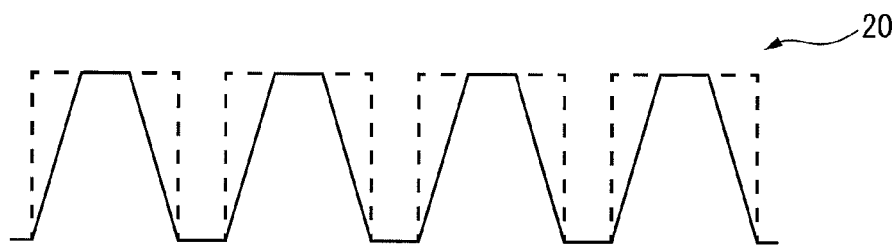
FIG. 2 is an enlarged view illustrating a signal generation unit of a rotor.

FIG. 2 is an enlarged view illustrating the signal generation unit of the rotor. In FIG. 2, the plurality of concave and convex portions of the signal generation unit 20 according to the present invention are indicated by a solid line. As illustrated in FIG. 2, sections of the convex portions of the plurality of concave and convex portions are tapered. According to the conventional technology, sections of a plurality of concave and convex portions are rectangular as indicated by a broken line in FIG. 2. Since a shape in the present invention is as indicated by the solid line, it can be understood that the formation of the signal generation unit 20 by electroforming or sintering may be easily made.

Figure 3:
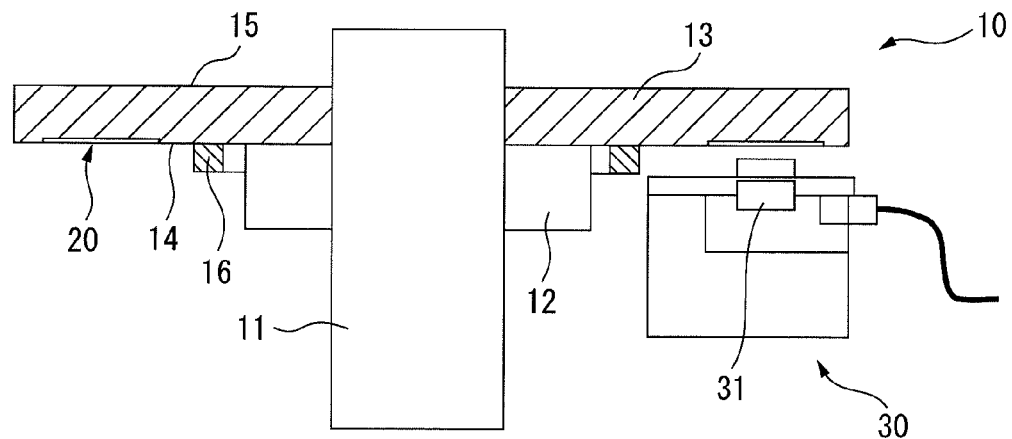
FIG. 3 is an axial-direction sectional view illustrating a magnetic detector according to a second embodiment of the present invention.
Figure 4:
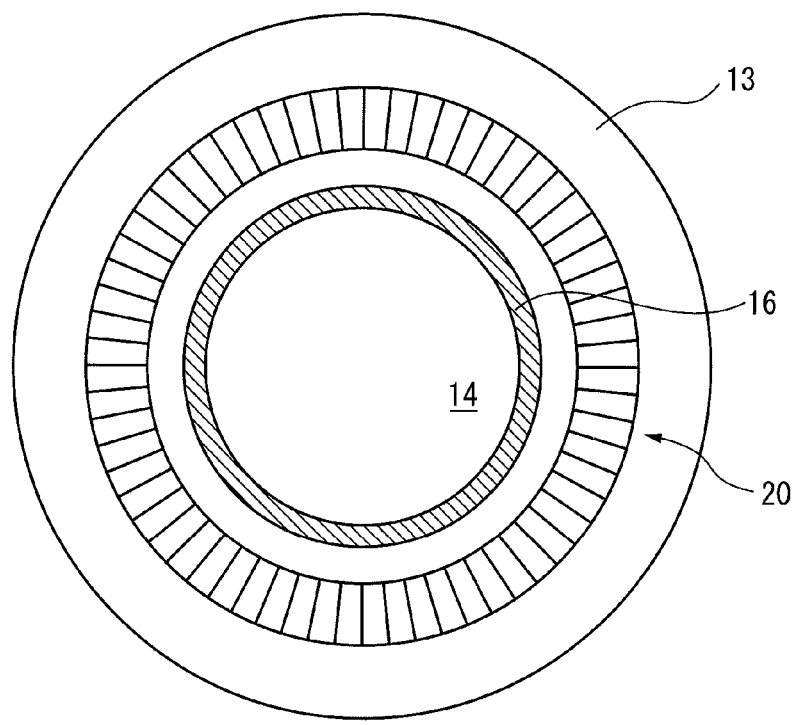
FIG. 4 is a bottom view of a rotor illustrated in FIG. 3.

FIG. 3 is an axial-direction sectional view illustrating a magnetic detector according to a second embodiment of the present invention. FIG. 4 is a bottom view of a rotor illustrated in FIG. 3. For simplicity, an illustration of a rotary shaft 11 and a support unit 12 is omitted in FIG. 4. As illustrated in FIGS. 3 and 4, in a bottom surface 14 of the rotor 13, an annular projection portion 16 is disposed coaxially with the support unit 12. The projection portion 16 is preferably formed integrally with the rotor 13. The projection portion 16 is located between the support unit 12 and a signal generation unit 20. A projection height of the projection portion 16 from the bottom surface 14 is sufficiently longer than a depth of a concave/convex portion of the signal generation unit 20.

Figure 5:
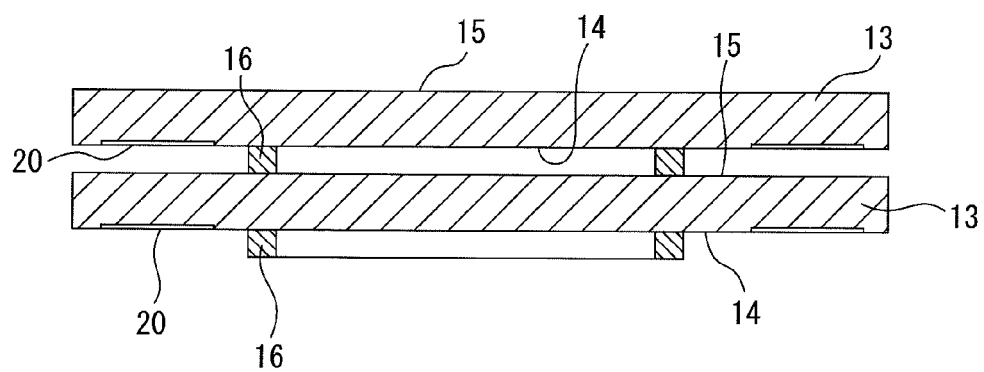
FIG. 5 is a diagram illustrating a stacked state of the rotors illustrated in FIG. 3.

A plurality of rotors 13 may be stacked to be moved with each other before the rotor 13 is assembled to the support unit 12 of the rotary shaft 11. FIG. 5 is a diagram illustrating a stacked state of the rotors illustrated in FIG. 3. As illustrated in FIG. 5, a projection portion 16 of the upper rotor 13 touches a top surface 15 of the lower rotor 13. Accordingly, a signal generation unit 20 of the upper rotor 13 does not touch the lower rotor 13 or other members.

Thus, according to the second embodiment, damaging of the signal generation unit 20 during transportation, storage of the rotor 13 or the like can be prevented. In addition, no packaging material is necessary between the upper and lower rotors 13. The magnetic detector 10 can be automatically assembled. According to the present invention, therefore, it can be understood that the magnetic detector 10 can be manufactured more inexpensively.

Figure 6:
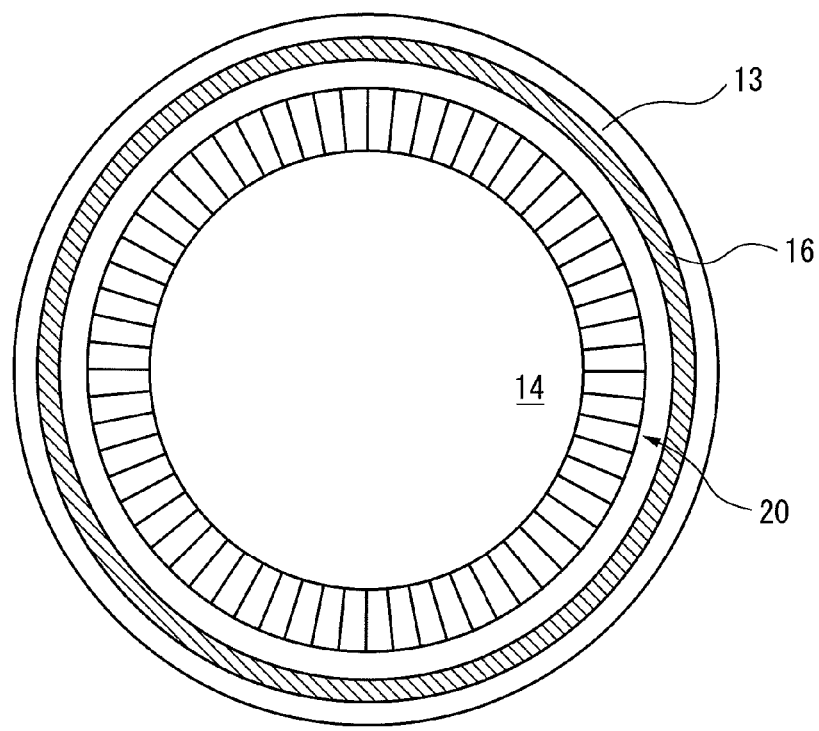
FIG. 6 is another bottom view of the rotor according to the second embodiment.

FIG. 6 is another bottom view of the rotor according to the second embodiment and similar to FIG. 4. In FIG. 6, a projection portion 16 is formed in a region between the signal generation unit 20 and an outer peripheral surface of the rotor 13. Alternatively, the projection portion 16 may be formed along an edge of the rotor 13. It is apparent that, even in such a case, the plurality of rotors 13 may be stacked as described above to prevent damaging of the signal generation unit 20.

FIGS. 5 and 6 illustrate the annular projection portion 16. However, the projection portion 16 may not necessarily be annular. As long as no contact is made with the top surface 15 of the other rotor 13 by the signal generation unit 20 or the projection portion 16 of the rotor 13, shapes and the number of projection portions 16 are not limited to those illustrated.

Figure 7:
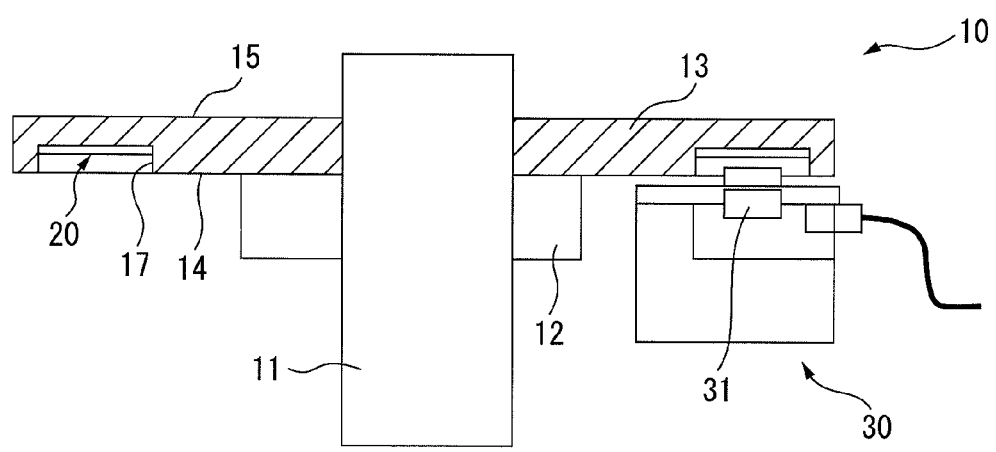
FIG. 7 is an axial-direction sectional view illustrating a magnetic detector according to a third embodiment of the present invention.

FIG. 7 is an axial-direction sectional view illustrating a magnetic detector according to a third embodiment of the present invention. As illustrated in FIG. 7, in a bottom surface 14 of a rotor 13, a circumferential groove 17 is formed to extend in an entire circumferential direction of the rotor 13. A signal generation unit 20 is formed in a bottom portion of the circumferential groove 17. A depth of the circumferential groove 17 is deeper than that of a concave/convex portion of the signal generation unit 20.

Figure 8:
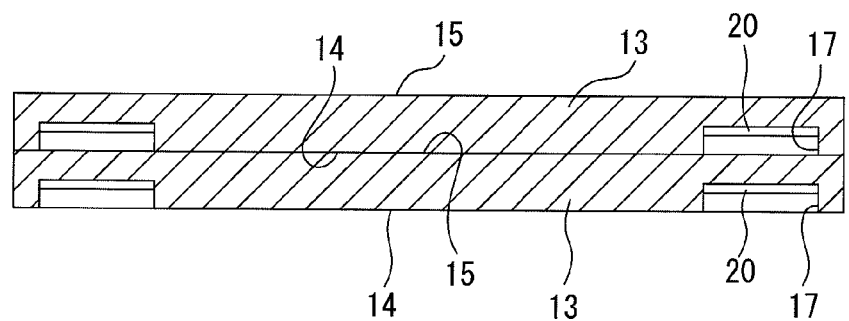
FIG. 8 is a diagram illustrating a stacked state of the rotors illustrated in FIG. 7.

FIG. 8 is a diagram illustrating a stacked state of the rotors illustrated in FIG. 7. As illustrated in FIG. 7, the bottom surface 14 of the upper rotor 13 touches a top surface 15 of the lower rotor 13. As described above, the signal generation unit 20 is formed in the circumferential groove 17. Accordingly, even when a plurality of rotors 13 are stacked, the signal generation unit 20 of the upper rotor 13 does not touch the top surface 15 of the lower rotor 13 or other members.

Figure 9:
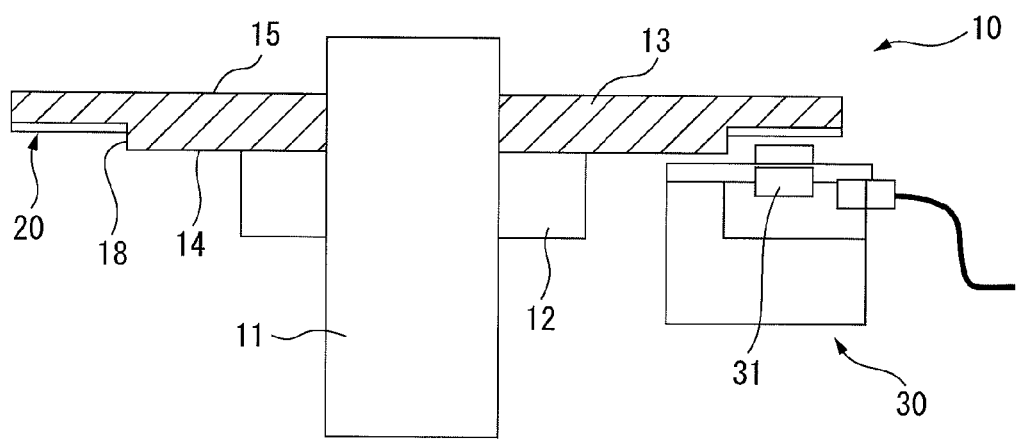
FIG. 9 is an axial-direction sectional view illustrating a magnetic detector according to yet another embodiment of the present invention.

FIG. 9 is an axial-direction sectional view illustrating a magnetic detector according to yet another embodiment of the present invention. As illustrated in FIG. 9, at an edge of a bottom surface 14 of a rotor 13, a circumferential notch 18 is formed to extend in an entire circumferential direction of the rotor 13. The circumferential notch 18 is a step portion including a surface parallel to the bottom surface 14 of the rotor 13 and a surface perpendicular to the bottom surface 14. A signal generation unit 20 is formed in the surface of the circumferential notch 18 parallel to the bottom surface 14. A depth of the circumferential notch 18 is deeper than that of a concave/convex portion of the signal generation unit 20.

Accordingly, as in the case described above referring to FIG. 8, even when a plurality of rotors 13 are stacked, the signal generation unit 20 of the upper rotor 13 does not touch a top surface 15 of the lower rotor 13 or other members. Thus, it can be understood that the third embodiment provides the same effects as those of the second embodiment. In addition, according to the third embodiment, since no projection potion 16 is necessary, the magnetic detector 10 can be manufactured inexpensively by reducing material costs more than in the second embodiment.

Effect of the Invention

According to the first aspect, the signal generation unit is formed by electroforming or sintering, and thus, the signal generation unit can be formed inexpensively with high accuracy. No penetration slit needs to be formed in the rotor, and strength enough to rotate the rotor at a high speed can be secured.

According to the second aspect, a projection portion of a certain rotor is brought into contact with another rotor, and a plurality of rotors can be stacked with each other. A signal generation unit of a certain rotor does not touch another rotor or the like, and, damaging of the signal generation unit is prevented. No packaging material is necessary between a certain rotor and another rotor. The magnetic detector can be automatically assembled. As a result, the magnetic detector can be manufactured more inexpensively.

According to the third aspect, one surface of a certain rotor is brought into contact with the other surface of the rotor, and thus a plurality of rotors can be stacked with each other. A signal generation unit of a certain rotor does not touch another rotor, and thus, damaging of the signal generation unit is prevented. No packaging material is necessary between a certain rotor and another rotor. The magnetic detector can be automatically assembled. As a result, the magnetic detector can be manufactured more inexpensively. In addition, material costs can be reduced more than the second aspect.

While the preferred embodiments have been described, as obvious to those skilled in the art, the above-described changes, various other changes, omissions, and additions can be made without departing from the scope of the present invention.

What is claimed is:

1. A magnetic detector manufacturing method, the method comprising steps of:
   preparing a rotor configured to rotate around a rotary shaft;
   forming a plurality of concave and convex portions of a signal generation unit on a surface of the rotor which is perpendicular to the rotary shaft and is not on a peripheral surface of the rotor by electroforming so that sections of the convex portions of the plurality of concave and convex portions are tapered in a direction parallel to the rotary shaft; and
   locating a detection unit, which detects a rotational angle of the rotor by using magnetism via the signal generation unit, to face the surface of the rotor on which the signal generation unit is formed, so as to manufacture a magnetic detector.

2. The magnetic detector manufacturing method according to claim 1, further comprising a step of disposing a projection portion radially inside or outside the rotor with respect to the plurality of concave and convex portions of the signal generation unit, in the surface of the rotor perpendicular to the rotary shaft.

3. The magnetic detector manufacturing method according to claim 1, further comprising a step of forming a circumferential groove or a circumferential notch is formed to extend in a circumferential direction of the rotor, in the surface of the rotor perpendicular to the rotary shaft;
   wherein the plurality of concave and convex portions of the signal generation unit is formed in the circumferential groove or the circumferential notch.

* * * * *